United States Patent

[11] 3,574,376

| [72] | Inventor | Wayne Cummins<br>P.O. Box 96, Garden City, Mich. 48135 |
|---|---|---|
| [21] | Appl. No. | 13,559 |
| [22] | Filed | Feb. 24, 1970 |
| [45] | Patented | Apr. 13, 1971 |

[54] SHEARABLE RESTRAINING MEANS
1 Claim, 5 Drawing Figs.

[52] U.S. Cl. .................................................... 287/189.36, 85/1
[51] Int. Cl. ......................................................... F16b 21/09
[50] Field of Search .............................................. 287/189.36 (F), 64; 85/1, 9; 188/1 (C); 297/386; 280/150 (SB)

[56] References Cited
UNITED STATES PATENTS

| 1,420,771 | 6/1922 | Smith | 85/1 |
| 2,527,616 | 10/1950 | Beckstrom | 287/189.36F |
| 2,877,170 | 3/1959 | Greenhalgh et al. | 188/1CX |
| 2,961,204 | 11/1960 | Rayfield et al. | 188/1CX |
| 3,198,288 | 8/1965 | Presunka | 188/1C |
| 3,438,674 | 4/1969 | Radke et al. | 297/386 |

Primary Examiner—David J. Williamowsky
Assistant Examiner—Andrew V. Kundrat
Attorney—Cullen, Settle, Sloman and Cantor ABSTRACT: A shearable restraining means of the bolt type which anchors two parts together. The bolt features a hardened plow shaped shank functioning as a cutter. When the bolt is moved by one part under excessive load it cuts and plows a slot in the other part. The energy required to plow such slot provides a dissipation of the energy of excessive tension on the first part.

PATENTED APR 13 1971  3,574,376

INVENTOR
WAYNE CUMMINS
BY Cullen, Settle, Sloman & Cantor
ATTORNEYS

SHEARABLE RESTRAINING MEANS

BACKGROUND OF THE DISCLOSURE

Field of the Invention

This invention relates to shearable restraining means wherein restraint is provided by a bolt on one part for shearing a slot in another part anchored to the first part.

THE INVENTION

In this application there is disclosed a simple and effective shearing and shearable means functioning as a restraining means.

An embodiment of the invention is disclosed in the appended drawing, in which.

DETAILED SPECIFICATION

Figure 1:
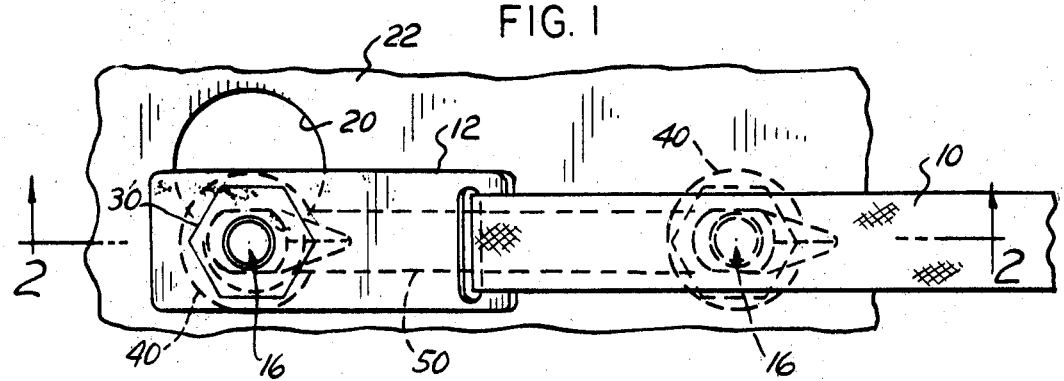
FIG. 1 is a plan view which diagrammatically illustrates a restraining means of the invention, fragmentarily shown.
Figure 2:
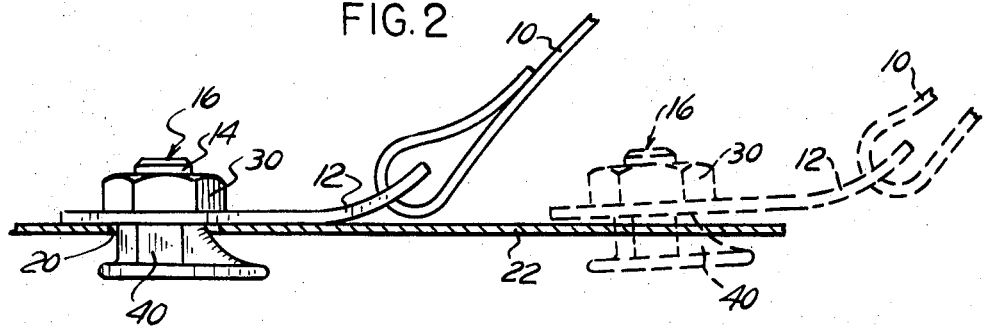
FIG. 2 is a section, as if on line 2—2 of FIG. 1.
Figure 3:
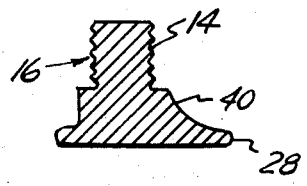
FIG. 3 is an elevation section view of a shearing member per se.
Figure 5:
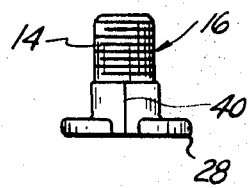
FIG. 5 is a right end view thereof.
Figure 4:
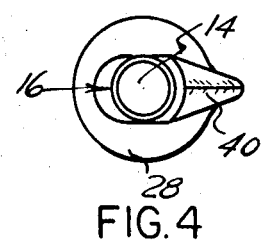
FIG. 4 is a plan view of the shearing member of FIG. 3.

To one end of a part 10, is fixed an anchor plate 12, connected to the shank 14 of a bolt 16, which is normally seated in a keyhole shaped aperture 20 of a stationary part 22. Bolt 16 has a large head 28. A nut 30 cooperates with the shank 14 to secure the plate 12 to the shank 14 and to secure the bolt 16 in slot 20. Bolt 16 has a plow shaped portion 40, and at least part 40 of the bolt and preferably the entire bolt, is made of hardened steel capable of cutting the part 22.

OPERATION

Normally, the bolt is inserted in the larger part of the aperture 20, and moved to the smaller part of such aperture, and anchor plate 12 is secured to shank 14 of the bolt 16 and bolt 16 is secured to plate 22 by the nut 30. The parts are so positioned that the plow 16 is aligned with the direction of pull on part 10.

Under the ordinary tension the pull of part 10 on bolt 16 will be resisted by the engagement of the shank 14 with the edge of the aperture 20 of plate 22.

Under excessive tension, the pull on part 10 will be excessive enough to pull shank 14 and bolt 16 through the edge of aperture 20 and well beyond it and plow 40 will cut a slot as shown in dotted lines 50 of FIG. 1, to move to the position shown in dotted lines. The energy required for cutting such slot 50 absorbs the energy imparted to the belt by the accelerated weight of the person being restrained by such belt, responding to the crash, assuming part 10 is a belt, for illustration.

Now having described the restraining means herein disclosed, reference should now be had to the claim which follows:

I claim:

1. A shear type of restraining means for a first part subject to normal as well as excessive tensions:

comprising a stationary, firmly anchored shearable second part having an aperture;

a hardened steel shearing bolt in said aperture; and firmly anchored to an end of said first part; and said bolt being of a material harder than the second part and formed with a plow shaped shearing shank and being capable of shearing said second part beyond said aperture, but only when the first part anchored to the bolt has been subjected to excessive tension and has pulled the bolt to the edge of the aperture and beyond through the second part.